United States Patent [19]
Berdan

[11] Patent Number: 5,824,261
[45] Date of Patent: Oct. 20, 1998

[54] MULTI-VENTING MOLDING APPARATUS

[75] Inventor: Karl Berdan, Midland, Canada

[73] Assignee: JPE, Inc., Ann Arbor, Mich.

[21] Appl. No.: 677,947

[22] Filed: Jul. 10, 1996

[51] Int. Cl.[6] ............................................. B29C 45/00
[52] U.S. Cl. ............................................. 264/572; 425/130
[58] Field of Search ............................. 264/572; 425/130

[56] References Cited

U.S. PATENT DOCUMENTS

| | | | |
|---|---|---|---|
| 5,078,949 | 1/1992 | Strunk et al. | 264/572 |
| 5,090,886 | 2/1992 | Jaroschek | 264/572 |
| 5,204,050 | 4/1993 | Loren | 264/504 |
| 5,423,667 | 6/1995 | Jaroschek | 425/130 |
| 5,484,278 | 1/1996 | Berdan | 264/572 |
| 5,612,067 | 3/1997 | Kurihara et al. | 264/572 |

FOREIGN PATENT DOCUMENTS 2287212  9/1995  United Kingdom ............ B29C 45/17

*Primary Examiner*—Catherine Timm
*Attorney, Agent, or Firm*—Ladas & Parry

[57] ABSTRACT

A multiple limbed component is molded in a gas injection mold with a corresponding number of outlets. The outlets are regulated by valves that are operated sequentially to permit progressive expulsion of the excess material in the mold cavity.

5 Claims, 2 Drawing Sheets

MULTI-VENTING MOLDING APPARATUS

The present application relates to gas-assisted injection molding apparatus and methods of performing such molding.

Gas-assisted injection molding involves the injection of gas into a molding cavity so as to expel a portion of the molding material from the cavity. The molding material in contact with the outer walls of the cavity solidifies upon injection of the molding material into the cavity and the subsequent injection of gas therefore can remove the liquid central portion of the molding material. The result is a hollow molded article that uses less material and is lighter in weight.

To obtain high quality product from such molding processes, the egress of molding material must be carefully controlled. If insufficient material is expelled, the result will be a relatively thick-walled, possibly solid article, and if the ejection is not properly performed, the finished article may show surface deformation that renders it unsuitable for subsequent processing.

These problems are addressed in U.S. Pat. No. 5,484,278 in which provision is made for control of the venting of the cavity by means of a vent valve and subsequent quality control is facilitated by the provision of a shear that allows visual inspection of the wall thickness associated with the finished article. The use of the vent valve assembly shown in the above patent has improved the quality of the resultant product. However, it has been found that where complex articles are to be manufactured, further control of the material flow from the cavity is required.

U.S. Pat. No. 5,090,886 discloses an injection molding apparatus in which provision is made for venting the cavity into a pair of outlets which are subsequently closed by stuffers in the cavity. This arrangement, however, does not provide for control of the inlet of the cavity and does not facilitate the molding of complex components that may have multiple limbs or complex shapes.

In the molding of such articles, it is necessary to ensure that each internal cavity is properly evacuated, not only for correct functioning of the component but also to permit subsequent processing.

Frequently the components molded will be painted and subjected to secondary heating which is taken into account when designing the component. If, however, the cavity is not properly evacuated, then the component will have significant stress induced during heating due to unequal wall thickness. This results in deformation and warpage of the component and a high rate of rejection.

It is therefore an object of the present invention to provide a molding apparatus and a method of molding which obviates or mitigates the above disadvantages.

In general terms, the present invention provides a molding machine in which multiple outlets are provided from the molding cavity to permit the molding of complex articles. Each of the outlets has a control valve associated with it that may be controlled to regulate the flow of material through the outlet passage. A valve is also associated with the inlet passage and a controller controls each of the valves such that the inlet valve is closed when the outlet valves are opened and that the outlet valves can be closed during at least a portion of the period in which gas is injected into the cavity.

More particularly, the present invention provides a gas-assisted injection molding machine comprising a mold cavity, a material inlet passage to transport molding material from a source to said cavity, a plurality of outlets from said cavity to permit egress of material therefrom, an inlet valve in said inlet passage to control flow of material along said inlet passage, an outlet valve in each of said outlet passages to control flow of material along said outlet passages, a gas injector to inject pressurized gas into said cavity to expel material therefrom and a control to control operation of said valves, said control closing said inlet valve during injection of said gas to inhibit flow in said inlet passages and opening said outlet valves during at least a portion of said injection of said gas to vent said cavity.

In a further aspect, the present invention provides a gas-assisted injection molding machine wherein said vent valves are operated sequentially during injection to open said passage and said shears are operated simultaneously upon ejection of molded material from said cavity.

Embodiments of the invention will now be described by way of example only with reference to the accompanying drawings, in which FIG. 1 is a schematic section of a cavity for a molded article;

Figure 1:
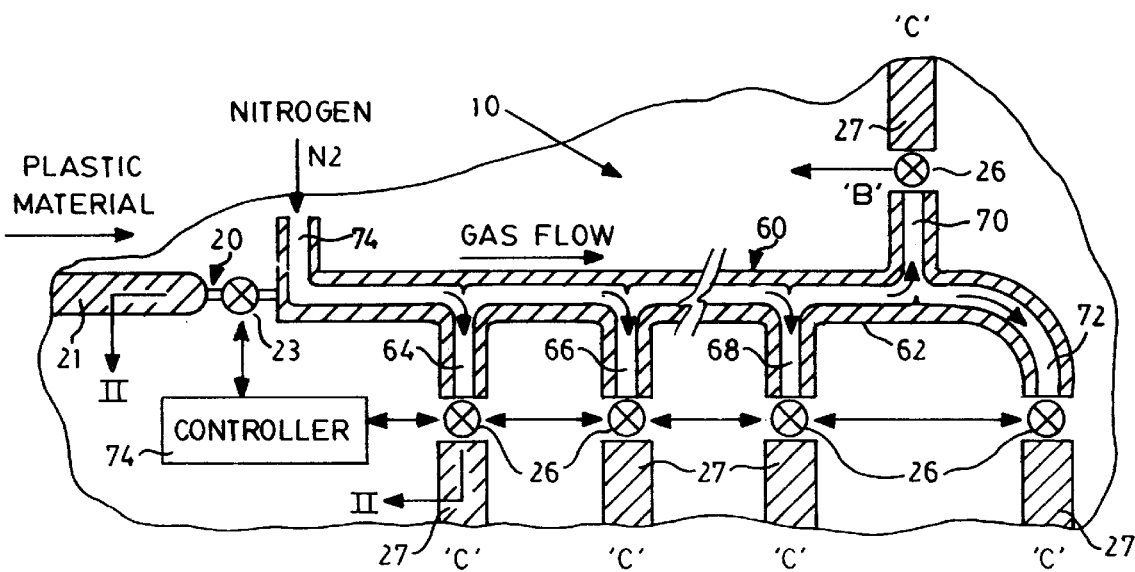
Figure 2:
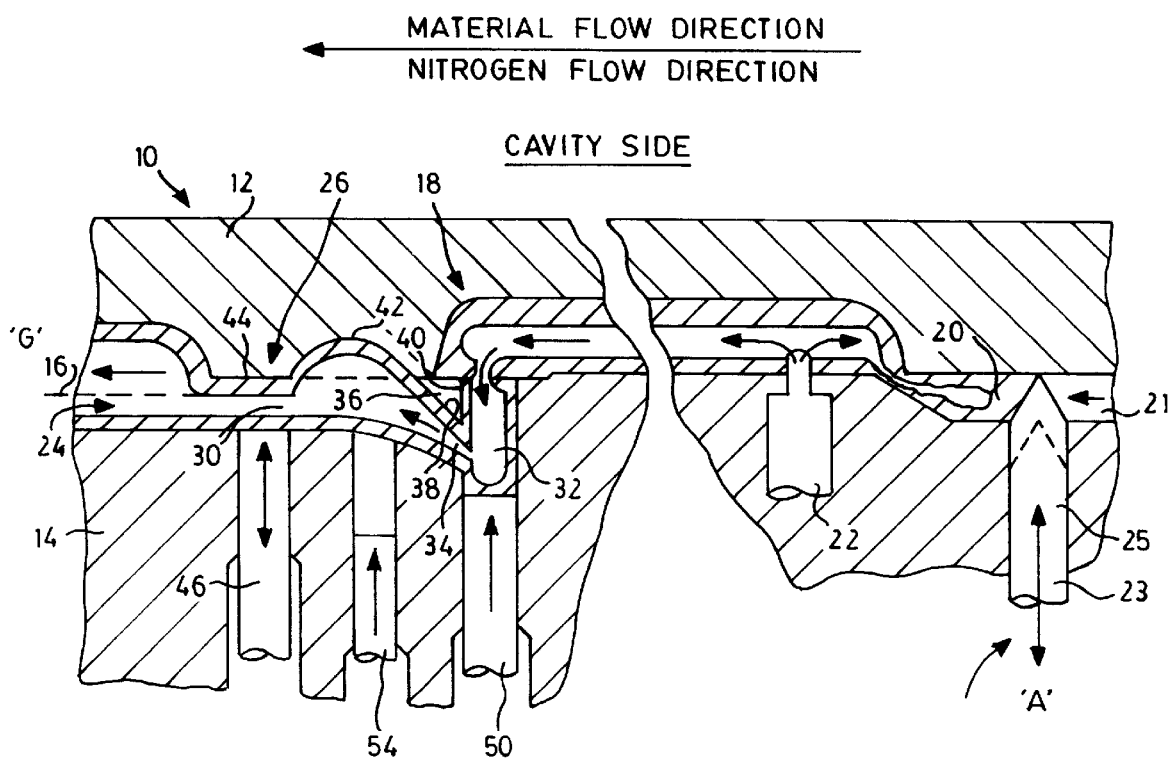
FIG. 2 is a section on the line 2—2 of FIG. 1.

Referring therefore to FIGS. 1 and 2, a gas-assisted injection molding apparatus generically identified as 10 has a cavity side 12 and a core side 14 that abut along the common plane indicated at 16. A cavity 18 is formed in the cavity side 12 and, together with the core side 14, defines the exterior surface of an article to be molded. As can be seen from FIG. 1, the article to be molded in the embodiment illustrated is a multiple outlet tubular manifold indicated at 60 having a main duct 62 and branches 64,66,68,70 and 72. An inlet 74 communicates with the main duct 62. The article 60 is to be molded with a relatively thin peripheral wall and a hollow interior to allow passage of fluids from the inlet 74 to one of the branches 64–72. It will be understood that the article 60 is by way of illustration only and, as will be described more fully below with reference to FIGS. 3–5, a variety of different shaped articles may be utilized with appropriate configuration of the cavity 18.

Referring again to FIG. 2, molding material is supplied through an inlet passageway 20 that extends between the supply of molding material 21 and the cavity 18. An inlet control valve 23 is positioned in the passageway 20 and consists of a retractable pin 25 that may be moved to a position in which the inlet passageway 20 is sealed.

A gas injection nozzle 22 is positioned in the core side 14 to project into the cavity 18 and supply gas under pressure to the interior of the cavity 18.

Molding material is expelled from the cavity 18 through one of a number of outlet passages 24. An outlet passageway 24 is associated with each of the branches 64–70.

Each of the outlet passages 24 includes a vent valve assembly 26 that controls the flow of molding material from the cavity 18 through the passage 24 and to a respective reservoir 27.

As is well known in the art, the cavity side 12 and core side 14 are movable relative to one another between a closed position as shown in FIG. 2 in which the cavity defines the outer surface of the article to be molded, and an open position in which the cavity side and core side are separated to allow the molded article to be removed. The mounting of the mold to permit this relative motion is well known in the art and need not be described further. Similarly, the provision of molding material to the inlet passageway 20 and the provision of the gas to the nozzle 22 is known in the art and will not be described further.

The form of the passageway 24 in which the vent valve assembly 26 is located includes a horizontal leg 30 and a vertical leg 32 that intersect at a throat 34. The legs 30,32 are separated by an anvil 36 that is defined by a pair of convergent surfaces that intersect at an apex having an acute included angle. The vertical leg 32 extends from the cavity 18 and is of uniform circular cross-section. The horizontal leg 30 is of progressively increasing cross-section as it extends from the throat 34 and has a smoothly curved dome wall 42 extending from the surface 38 across the common plane 16. The domed wall 42 terminates at a planar abutment surface 44 that extends to the reservoir 27.

The vent valve 26 includes a valve member 46 to regulate flow through the passageway 24, a shearing pin 50 to sever material in the passageway 24, and an ejector pin 54 to eject material from the passageway 28. Valve member 46 is slidably mounted in a bore 48 provided in the core member 14 opposite the abutment surface 44. The valve member 46 is movable under the control of a controller 74 by air or hydraulic fluid and is effective to prevent flow through the passageway 24.

Shearing pin 50 is slidably mounted in a bore 52 provided with an extension of the vertical leg 32. The shearing pin 50 is slidable across the throat 34 and into the vertical leg 32 along the surface 40.

Ejector pin 54 is likewise slidably mounted in a bore 56 opposite the dome wall 52 and is slidable along the bore 56 to engage and eject material in the passageway 24. The valve member 46, shearing pin 50 and ejector pin 54 are operated by control signals from the controller 74 and may be operated by air hydraulic electrical or mechanical cam actuation and interlocked with the operation of the mold.

The controller 74 is operable to operate the valve members 46 of each of the vent valve assemblies 26 independently and also control operation of the inlet valve 23 in the inlet passageway 20.

In operation, the cavity side 12 and core side 14 are moved to a closed position to define the cavity 18. Material is introduced in the molten state through the inlet passageway 20 to fill the cavity 18. In this condition, the controller 74 maintains the vent valve assemblies 26 closed and the inlet valve 23 open. Once the cavity 18 is full, the inlet valve 23 is closed by controller 74 and a gas under pressure is introduced through the nozzle 22. At the same time, a first outlet valve 26 that is closest to the point of injection of the gas is opened and the material in the cavity is expelled through the associated passageway 24 to the overflow reservoir 27. An outer wall of molding material is left within the cavity following the application of gas between the injection point and the outlet. The overflow reservoir is sized to correspond to the volume of material to be expelled through the outlet with which it is associated. Accordingly, after expulsion of the material, a further vent valve 26 is opened in the outlet which is the next closest to the point of injection and material is further expelled through that outlet. The vent valve assemblies 26 are operated in sequence from the closest to the furthest from the point of injection so that material is progressively expelled from the interior of the article. The sequential opening of the valves allows close control over the flow of material, ensuring that the material is expelled in a controlled progressive manner. Once all the outlets have been opened and the material expelled, the mold is opened by separation of the cavity side and core side along the common plane 16. The molded article remains located on the core side by virtue of its connection with material in the passageways 24. Once the mold is opened, the shearing pin is advanced along the bore 52 and moves across the throat 34. The shearing pin 50 engages material deposited in the vertical leg 32 and forces it against the anvil 36. The convergent surfaces 38,40 enhance the shearing action of the pin 50 to sever the material in the passageway.

As the shearing pin 50 advances, it operates in conjunction with the additional ejection pins (not shown) to eject the molded article. At the same time, the ejector pin 54 is advanced along the bore 56 to engage the material in the passageway between the valve member and throat. Because the dome wall 42 and outlet passage 24 straddle the separation plane 16, the ejector pin 50 pushes the waste material from the mold. The mold may then be prepared and closed for subsequent molding operation.

The shearing action of the pin severs the material at the throat 34 so that a cross-section of the material may be viewed after ejection by the pin 54. Each of the cross-sections will indicate whether the waste material is voided at its associated branch giving a visual indication as to whether or not the gas has been effective to purge the material from the interior of the article. This preliminary check is a good indication as to the quality of the finished article.

The walls of horizontal leg 30 and of the passageway 28 adjacent the throat 34 diverges at an included angle in the order of 20° to facilitate removal of the waste material. The included angle between the surfaces 38 and 40 is preferably in the order of 60°, with the axis of the vertical leg being normal to the longitudinal axis of the cavity 18. To facilitate flow of material through the passageway 24, it is preferred that the shearing pin is retracted beyond the projection of the horizontal leg past the throat 34 as indicated.

In the above example, the overflow reservoirs 17 are sized so as to be filled once the material has been expelled. This maintains the pressure within the interior of the cavity 18 and therefore provides for expulsion of subsequent portions of the article together with an overall pressurization of the cavity once the material is expelled that promotes good surface finish on the exterior of the article.

In an alternative mode of operation, the controller 74 may be utilized to close the valve member 46 against the abutment surface 44 after the requisite material has been expelled but before the subsequent valve assembly 26 is opened. Accordingly, the valves 26 are sequentially opened then closed in accordance with their distance from the point of injection to maintain the pressurization of the cavity 18, both during expulsion of the material and subsequent thereto.

During the expulsion of the material, the inlet valve is maintained closed so that gas is not able to pass into the source of the material.

By sequential operation of the valves and by control of the passage of gas through the cavity 18, an improved molding is obtained even where complex shapes are to be molded.

As noted above, the article shown in FIG. 1 is merely exemplary and alternative configurations of mold may be utilized to achieve similar benefits.

Figure 3:
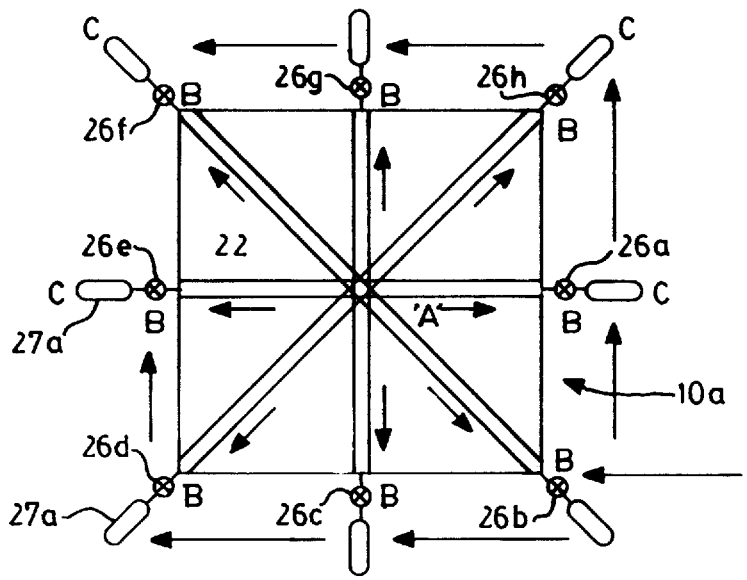
FIG. 3 is an alternative embodiment of a mold cavity.

In the example shown schematically in FIG. 3, a plurality of elongate tubular articles are prepared in a common mold 10. The injector 22 is located centrally within the mold with outlet passages 24 and respective valves 26 disposed about the periphery of the mold. An inlet 23 is also located centrally opposite the injector 22 but is not shown for clarity. Each outlet has an overflow reservoir 27a associated with it. The controller 74a sequences the valve so that those in the midpoint of each side, i.e. those indicated 26a, 26c, 26e, 26g, are opened initially and that the valves 26b, 26d, 26f, 26h are opened subsequently. In this manner, a controlled expulsion of molding material is accomplished.

Figure 4:
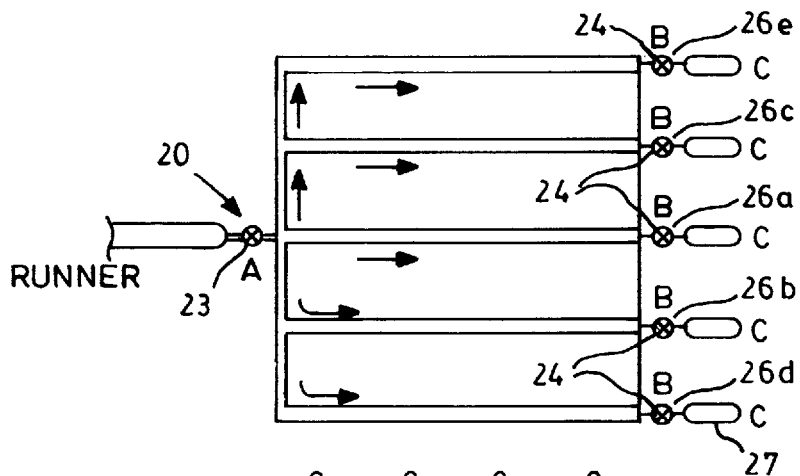
FIG. 4 is a further embodiment of a mold cavity.

In the arrangement shown in FIG. 4, a plurality of parallel elongate molded articles is obtained with the inlet passage 20 located at one edge of the mold and the outlet passages 24 located at the opposite edge. In this arrangement, the controller 74 initially opens the central vent valve indicated at 26*a* followed by the vent valves 26*b*, 26*c* and finally the vent valves 26*d*, 26*e*. Again, a progressive expulsion of material is obtained from the molded article.

Figure 5:
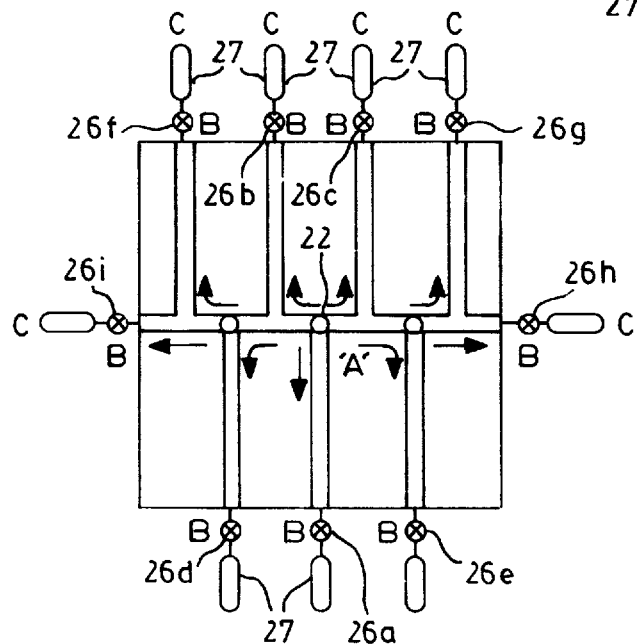
FIG. 5 is a still further embodiment of a mold cavity utilizing the components of FIG. 2.

In the arrangement shown in FIG. 5, the inlet passage 20 is centrally located and the outlet passages disposed on the periphery of the mold. Again, the vent valves 26 are operated sequentially starting with the valve closest to the inlet passage 20, so that valve 26*a* is initially opened followed by the valves 26*b* and 26*c*, then the valves 26*d* and 26*e*, followed by the valves 26*f* and 26*f*, and finally the valves 26*h* and 26*i*.

It will be seen, therefore, that by providing multiple outlets and by sequencing the operation of the valves controlling those outlets, it is possible to mold complex articles while retaining control over the quality of the finished article.

I claim:

1. A method of injection molding an article in a mold cavity having an inlet and plurality of outlets comprising the steps of injecting moldable material into said cavity through the inlet, closing said inlet to inhibit movement of material therethrough, injecting gas under pressure into said cavity to expel a portion of said moldable material therefrom through said outlets, closing said outlets during injection of gas into said cavity to pressurize said cavity and opening said outlets, one at a different time than another to permit expulsion of said material through each of said outlets at varying times so that said moldable material is expelled in a controlled progressive manner, and ejecting said article from said cavity.

2. A method according to claim 1 wherein said outlets are opened sequentially.

3. A method according to claim 2 wherein those outlets closet to the point of injection of said gas into the mold are opened before other outlets.

4. A method according to claim 3 wherein an open outlet is closed prior to opening of said outlets.

5. The method according to claim 1, wherein the plurality outlets are sequentially opened then closed in accordance with their distance from the point of injection of the gas into the cavity in order to maintain pressurization of the cavity during expulsion of the moldable and subsequent thereto.

* * * * *